May 10, 1955 — A. B. SOWTER — 2,707,823
METHOD OF MAKING WIRE JOINTS BY COLD PRESSURE WELDING
Filed June 3, 1950 — 2 Sheets-Sheet 1

INVENTOR
ANTHONY BAGNOLD SOWTER
BY
ATTORNEY

May 10, 1955 A. B. SOWTER 2,707,823
METHOD OF MAKING WIRE JOINTS BY COLD PRESSURE WELDING
Filed June 3, 1950 2 Sheets-Sheet 2

INVENTOR
ANTHONY BAGNOLD SOWTER
BY
ATTORNEY

United States Patent Office 2,707,823
Patented May 10, 1955

2,707,823

METHOD OF MAKING WIRE JOINTS BY COLD PRESSURE WELDING

Anthony Bagnold Sowter, Wembley, England, assignor to The General Electric Company Limited, London, England Application June 3, 1950, Serial No. 165,904

Claims priority, application Great Britain August 3, 1949

1 Claim. (Cl. 29—470.1)

The present invention relates to cold pressure welding, that is, welding solely by pressure and without the supply of any substantial amount of intentional external heat, more particularly to novel means for and methods of welding together of copper, aluminum or other suitable metal wires, bars or rods, capable of being cold pressure welded and having a circular, oval or other rounded cross-section possessing no flat or substantially flat part at any point around the circumference thereof.

In cold pressure welding, the surfaces of the members or parts to be welded, after having been cleaned to produce metallic surfaces uncontaminated by matter foreign to the metal of said members, are placed in face-to-face relation, whereupon a pressure is applied to the contacting members in such a manner as to cause a substantial flow or displacement of the metal laterally of the effective pressure or welding area and to thereby firmly bond the adjoining surfaces and to effect an intimate welding joint therebetween.

Where circular section wires of aluminum, copper or other cold weldable metal are to be joined together by a cold welded lap joint with the two wires in line at the joint, it has previously been proposed in my co-pending application, Serial No. 138,535, filed January 14, 1950, entitled Means for Cold Pressure Welding, to flatten each wire or rod at the part where it is to be welded to the other wire, to clean the flattened surfaces to be welded, preferably by scratch-brushing, until metallic surfaces substantially uncontaminated by matter foreign to the metal of the wires are obtained and then to place the cleaned surfaces in face-to-face relation and to effect the cold weld by means of suitably shaped cooperating pressure tools or dies whose welding surfaces are flat or substantially so in the direction of flow of the metal at welding. The pre-flattening of the wires or rods prior to the cold welding has the purpose of preventing the wires from slipping off one another as they are subjected to pressure during welding.

Obviously, this pre-flattening of the wires is an operation which takes time and an object of the present invention is the provision of a method of and means for cold welding rods, wires or similar work pieces which makes pre-flattening substantially unnecessary.

Another disadvantage of a cold weld joint applied to pre-flattened wires consists in a tool-formed depression or indentation which not only reduces the strength of the joint, but may be undesirable for reasons of appearance, etc.

Accordingly, a further object of the invention is the provision of a novel means for and method of cold pressure welding the ends of a pair of rods, wires, etc., in line with each other, by which any tool-formed depression or other distortion of the wires at the joint is substantially avoided.

With the above objects in view, the invention involves generally the recessing or grooving of flat or substantially flat welding surfaces of the pressure tools, in such a manner that the tools themselves serve to locate or help to locate the wires, bars or rods which are to be welded together. At the same time, this has the advantage that the wires may be welded right across the entire cross-section, thus resulting in a joint of increased mechanical strength which may be cleaned or freed from any undesirable projections formed by the displaced metal, to provide a uniform and smooth joint undistinguishable from a normal unjointed rod or wire.

The grooves or recesses are continuous along the whole length of the welding surfaces of the tools and may have such a cross-section that the rounded surfaces of the wires, bars or rods do not accurately fit therein, or the grooves may have a cross-section accurately fitting the wires or rods, as will become more apparent from the specific embodiments of the invention described in detail hereafter.

The above and further objects as well as novel aspects of the invention will become more apparent from the following detailed description taken in connection with the accompanying drawings, forming part of the specification, and wherein.

Like reference characters identify like parts throughout the different views of the drawings.

According to one embodiment of the invention, the diameter of a wire, bar or rod, parallel to the welding surface of a tool, exceeds the mouth width of the groove or recess in the tool surface so that the wire, bar or rod overlaps the grooves or recesses on both sides. Thus, the mouth width may only be about ⅓ of said diameter, so that if the two wires of circular cross-section are placed one upon the other and between the tools, as the latter are brought together to bear on the wires, there will generally be three lines of applied pressure on a wire at the beginning of the pressing operation. One will be where the wire abuts against the other wire and the other two will be where the wire engages each side or edge of the mouth of the groove or recess in the surface of the adjacent welding tool.

Figure 1:
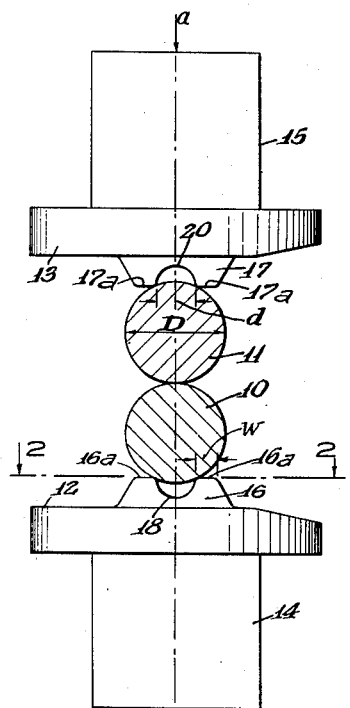
Figure 1 shows a side view of a cold welding tool arrangement for welding together the ends of a pair of round wires or rods, the tools being shown in their relative position to the rods or wires at the beginning of the welding operation.
Figure 2:
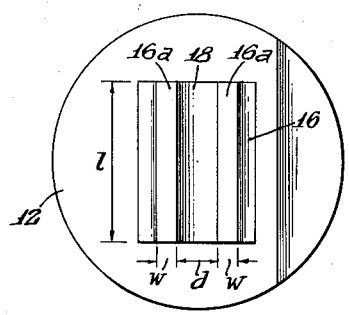
Figure 2 is a plan view of one of the welding tools shown in Figure 1.

Referring more particularly to Figures 1 to 2, there is shown schematically a tool arrangement for producing a cold welded wire joint of the above type in accordance with the invention. Numerals 10 and 11 represent a pair of overlapping wires or rods having a circular cross-section and consisting of aluminum, copper or other metal or metal alloy capable of being cold pressure welded. The rods 10 and 11 are placed between a pair of welding tools, each comprising a flanged tool piece 12 and 13 secured to or integral with a cylindrical member 14 and 15 forming part of a press, such as a hand press, hydraulic press or any other suitable pressure applying means (not shown), and a pair of substantially flat-faced welding tips or ribs 16 and 17, projecting from the faces of the flanges 12 and 13, respectively.

Each of the tool tips 16 and 17 is provided with a central groove 18 and 20, respectively, running in the longitudinal direction or parallel to the length of the aligned and overlapping wires or rods 10 and 11. The mouth width $d$ of the grooves 18 and 20 shown to be of semi-circular cross-section is a fraction, say about ⅓, of the diameter D of the wires or rods 10 and 11, whereby the grooves serve as a means for locating the wires and to prevent relative slipping, as the tools are brought together and pressure is applied upon the wires in the direction of the arrows $a$ during the welding operation.

Figure 3:
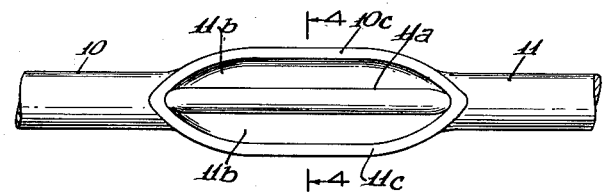
Figure 3 is a plan view of the completed wire joint obtained by means of a tool assembly according to Figure 1.
Figure 4:
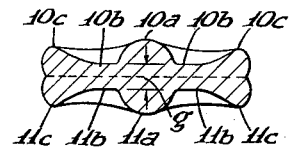
Figure 4 is an enlarged cross-section of the cold welded joint shown in Figure 3, taken on line 4—4 of Figure 3.

As a result, the metal of the wires 10 and 11 will be rendered sufficiently plastic so as to flow both in a direction laterally outwardly or at right angle to the direction of the pressure $a$, as well as inwardly and into the grooves or recesses 18 and 20. After a predetermined distance or gap $g$, Figure 4, between the operative welding surfaces 16a and 17a of the tools has been reached, the pressure is released, thus resulting in a pair of linear cold welded joints or connections 10b and 11b, on the opposite sides of a central stiffening rib or projection 10a and 11a, as shown in Figures 3 and 4. The displaced excess metal outwardly of the joints 11b forms a pair of ears or fins 10c and 11c as shown in the drawing.

In order to obtain a satisfactory wire joint of this type, the width $w$ of the welding surfaces 16a and 17a is approximately equal to or of the order of one-half of the groove diameter $d$, or ⅙ of the diameter D of the rods or wires in the example given, while the final gap $g$ at the welding joint is determined by the characteristics of the particular metal of the wires being about ⅛ in the case of copper and ⅓ in the case of aluminum of the total thickness of the wires 10 and 11. These values, are, however, by no means critical and may be varied within limits to suit special requirements and conditions.

Besides having the effect of locating the wires or rods 10 and 11 during the initial part of the welding operation, the grooving of the tool surfaces provides a central rib 11a in the finished joint which tends to improve the mechanical strength of the joint. The wires or rods may or may not be welded together in the center of the ribs 10a and 11a, the main cold pressure welding being, of course, on each side of the ribs 10a and 11a and over the linear areas 10b and 11b. However, by a suitable design of the tool surface, a continuous weld right across the joint can be obtained.

The working surfaces of the tools may be extended laterally on both sides of the wires or rods to be joined, so that, after welding, all the metal of the wires at the joint is contained between the tool surfaces or, alternatively, the surfaces may be such that metal flows, on welding, laterally out of the tools.

According to a further embodiment of the invention, a welding tool is formed with a groove which accurately fits the wire, rod or bar to be welded. By this means, welds are obtained consistently, not only laterally of the groove in the tool in the manner described, but right across the mouth of the groove or the full longitudinal section of the wires. With a weld of this type, the displaced metal or projecting fin laterally of the groove or wire can be trimmed off to leave a neater weld or joint.

Additionally, it has been found, particularly in the case of wires, rods or bars of different diameter, that two cooperating tools may be used, one of which is grooved and the other of which is flat and extends laterally well beyond the sides of the groove in the first tool.

By using tools of the aforementioned type, it is possible to obtain welds, according to the invention, in straight circular section rods, which if trimmed or otherwise freed from the projecting fins caused by the displaced metal, differ only slightly, if at all, in appearance from the original bar section or surface. Furthermore, aluminum may be welded to copper, and generally, in welding, the tools are brought together to produce the necessary reduction in thickness of the metal and flow to effect welding.

Referring to Figures 5 to 9, there is shown a tool arrangement of this type, wherein the overlapping ends of the wires or rods 10 and 11 accurately fit the grooves 25 and 26 of a pair of otherwise flat-faced welding or pressure tools 27 and 28, respectively. Laterally of the grooves 25 and 26, the faces of the tools 27 and 28 are provided with recesses or clearance holes 30 and 31, respectively, shown to be of semi-circular cross-section and having a diameter smaller than the diameter of the grooves 25 and 26, to accommodate the metal displaced laterally of the rods during the welding operation.

Figure 7:
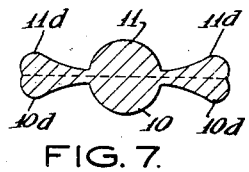
Figure 7 is an enlarged cross section, taken on line 7—7 of Figure 6.

In the example shown, when the tools 27 and 28 are brought together until the flat surfaces thereof engage one another (see Figure 8) the faces 27a and 28a intermediate between the recesses 25 and 30 and 26 and 31, respectively, are of a reduced height compared with the outer faces of the tools 27 and 28, differing from the latter by a predetermined distance $c$, to enable a ready flow or lateral displacement of the metal at welding. In other words, the initial total thickness of the lapped wires 25 and 26 equal to two diameters is reduced by substantially 50%, resulting in a final cross-section of the weld conforming to that of a single wire, as shown by Figure 7. The size of the final gap between the faces 27a and 28a may be determined by experiment to suit the particular conditions and type of metal.

Figure 6:
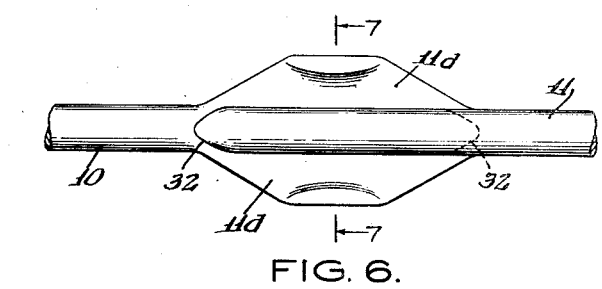
Figure 6 is a plan view of a joint obtained by means of the tools shown in Figure 5.

Figure 6 shows a top view of a cold welded wire joint of this type with the displaced metal forming a pair of lateral fins or ears 10d and 11d which may be removed so as to obtain a smooth and neat wire joint. In order to obtain a smooth transition or connection in each end of the wires 10 and 11 with the other wire, the ends may be wedge-shaped or chamfered as indicated at 32 in the drawing. Thus, the ends of the wires may be pointed to reduce the abruptness in the change of cross-section, an included angle of about 60° having been found to give satisfactory results. When one wire is of different material than the other, the harder one is preferably made of wedge-shape of about two diameters of its length and the wedge is placed vertically with respect to the other wire. Trimming of the projecting ears or fins 10d and 11d makes little difference to the strength of the joint, because micro-sections show that the weld extends for the full width of the interface between the rods or wires.

A suitable value for the gap between the two faces 27a and 28a when closed has been found to be .040", this being suitable for smaller wires of from .1 to .150" in diameter. It can be increased considerably, if desired, for the larger wires, but where the power is available there is little point in doing this until ¼" diameter is exceeded. The usual overlap of the full section wires in the welding tool may be from 4 to 5 diameters.

Figure 8:
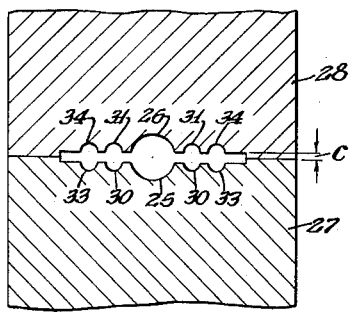
Figure 8 shows a modification of a pair of cold welding tools of the type according to Figure 5.

According to the modification shown in Figure 8, additional clearance holes or recesses 33 and 34 are provided, to allow for a ready flow of the displaced excess metal laterally of the rods or wires of the metal.

Figure 9:
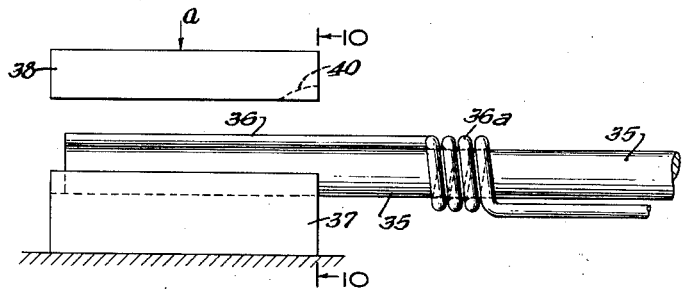
Figure 9 is an elevation of a cold welding tool assembly according to the invention for joining a wire of given diameter to a wire or rod of substantially larger diameter.
Figure 10:
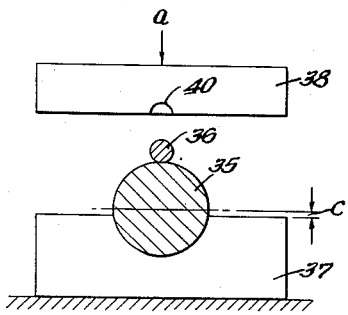
Figure 10 is an end view taken on line 10—10 of Figure 9.
Figure 12:
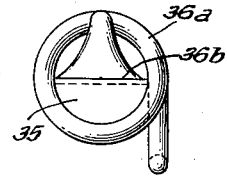
Figure 12 is an end view of the wire joint as shown in Figure 11.

Referring to Figures 9 to 12, in welding the end of a wire 36 to the end of a rod 35 of substantially larger diameter, the wire being soft and the rod being half hard and both consisting of copper, aluminum or other cold weldable metal or alloy, the parts to be welded are cleaned, such as by scratch-brushing in known manner and the wire may have a few turns wound around the rod before running up to the end of the rod, as shown at 36a in the drawings. The end of the rod 35 is placed in a grooved tool 37 whose grooved diameter is the same as that of the rod 35, the depth of the groove being such that the top of the groove is short of the axis of the rod by a predetermined distance as shown at c in Figure 9. The tool length may be about four times the diameter of the rod 35 and a further tool 38 which cooperates with the tool 37 and bears on the wire 36, is flat and of the same length as the latter, being placed directly above it and in line with the groove as shown in the drawing. The tool 38 extends laterally for some distance on each side of the groove, as shown in Figure 10, and may be such that no metal of the wire or rod overflows its surface. The end of the tool 38 remote from the free end of the wire 36 and rod 35 where it bears on the wire at that point where it reaches the welding point is provided with a groove 40 which tapers away to nothing along its length, to prevent any sudden change in thickness of the wire between the weld and the rest of its length. According to a practical example of a joint of this type, if the rod 35 has a diameter of ¼" and the wire 36 has a diameter of .1", the length of the tools may be about 2", the distance c equal to .02" and the lengths of the groove 40 about ³⁄₁₆".

To weld the wire 36 to the rod 35, the tool 38 is brought unto the wire and rod with pressure, until the gap between the tool faces is .04" or twice the distance c. Metal flows both laterally and axially and the wire will be flattened as shown at 36b, Figures 11 and 12, and welded to the flattened surface of the rod 35, the weld in section having the appearance of a semi-circle with two lateral ears, or fins which may be removed or trimmed off, as shown in the drawings. Obviously, the ears need not be trimmed nor need the wire be wound around the rod, but a few turns of the wire around the rod gives the wire some considerable strength against being torn around the rod, thus relieving the cold welding joint of tearing or other stresses effecting the same.

There is thus provided by the invention a novel method of and means for joining the end portions of a pair of rods or wires of circular or otherwise rounded cross-section by cold pressure welding in a single operating step, by proper control of the welding pressure to effect a suitable cold flow of the metal of the rods or wires to be joined and to produce a firm and intimate cold welded connection therebetween.

More particularly, in the embodiment according to Figures 1 to 4, the operation involves basically a combined flattening and subsequent cold welding of the rods or wires, thereby combining the steps according to the aforementioned co-pending application into a single operation. Thus, as pressure is applied to the rods or wires 10 and 11 by the tools 16 and 17, the latter act at first as a means for flattening the wires, the flattening surfaces being interrupted by the grooves or recesses 18 and 20 so as to result in flat end portions having projections or stiffening ribs 10a and 11a, in the manner shown and described hereinabove. As the pressure application is continued, the pressure or welding faces 16a and 17a on either side of the ribs 10a and 11a will effect an additional flow and displacement of the metal in a lateral and outward direction, to result in a pair of longitudinal strip-like or linear welds 10b and 11b and projecting fins 10c and 11c, in a manner described and understood from the foregoing.

Figure 5:
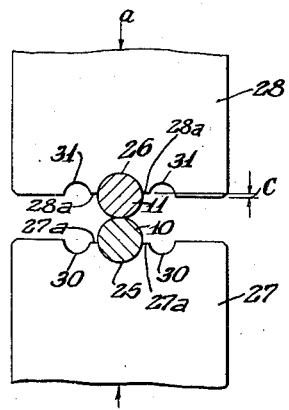
Figure 5 shows a pair of modified pressure tools for producing a cold welded wire joint according to the invention.

According to the embodiment shown in Figures 5 to 7, only the contacting halves of the wires 25 and 26 will be flattened with the displaced metal flowing laterally and outwardly into the relief holes or recesses 30 and 31, the remaining halves of the wires being contained by the grooves 25 and 26 of the tools 27 and 28 in which they fit accurately. As a result of the progressive squeezing or flattening of the adjoining contacting surfaces of the wires 25 and 26 and flow of the metal laterally in a direction away from said surfaces, a cold welding of the latter is effected, resulting in a joint right across the entire diameter of the wires, as pointed out above. The pressure may be so controlled as to result in a welded joint of a cross-section substantially equal to and in line with the cross-section of the unjointed wires, whereby by trimming off of the projecting fins 11d, the wire joint will be undistinguishable in shape or cross-section from the remaining portions of the wires.

Figure 11:
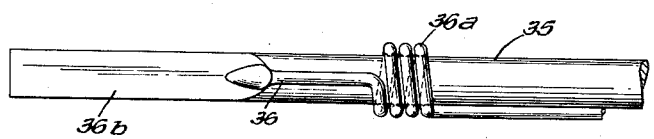
Figure 11 is a plan view of the completed wire joint obtained by means of tools according to Figures 9 and 10.

The embodiment according to Figures 9 to 11 constitutes a specific example of the embodiment according to Figures 5 to 7, in that the wire 36 having a substantial smaller cross-section than the rod 35 will make the use of a recessed tool unnecessary. Otherwise, the operation and production of the cold welded joint is analogous to the preceding modification. If desirable, the rod 35 need not be flattened to a half round or semi-circular shape as shown in the drawing, but may have any desired final shape by the proper design of the recess or groove in the tool 37.

In the foregoing, the invention has been described in reference to a few specifically illustrative devices. It will be apparent, however, that many variations and modifications, as well as the substitution of equivalent elements and steps for those herein described, may be made without departing from the broader spirit and scope of the invention as set forth in the appended claim. The specification and drawings are accordingly to be regarded in an illustrative rather than in a limiting sense.

I claim:

A method of joining a pair of members of substantially circular cross-section of cold pressure weldable metal comprising arranging the members with the portions to be joined in aligned overlapping relation so as to engage one another at a substantially linear interface, supporting substantially the outer halves of each member against distortion while allowing the metal of the unsupported inner or adjacent halves of each member to cold flow freely under the effect of welding pressure applied to the members, applying pressure to the contacting members in a direction substantially at right angle to the tangential plane through said interface, to distort the metal of said inner halves, starting at and adjacent to said interface changing the same from a linear configuration to an extended lateral area and creating an intensive lateral metal flow thereat, and continuing the pressure application to cause substantially the entire metal of said unsupported halves to flow outwardly, bringing said supported halves substantially together to combine into a single member cross-section substantially conforming with the cross-section of one of said members, while allowing the displaced excess metal to escape laterally outwardly beyond said single member cross-section substantially in the direction of said plane, whereby to weld said members by a solid phase welding bond by the interfacial metal flow thereat.

References Cited in the file of this patent

UNITED STATES PATENTS

| | | |
|---|---|---|
| 2,522,408 | Sowter | Sept. 12, 1950 |
| 2,560,678 | Wirt | July 17, 1951 |